(12) United States Patent
Subramanian et al.

(10) Patent No.: US 9,866,579 B1
(45) Date of Patent: Jan. 9, 2018

(54) ADAPTIVE RISK MITIGATION ENGINE TO FACILITATE SAFE INTERACTIONS BETWEEN ENTITIES

(71) Applicant: GOOGLE INC., Mountain View, CA (US)

(72) Inventors: Bharadwaj Subramanian, San Jose, CA (US); Matthew Knouse, Mountain View, CA (US); Charles Zaffaroni, Portola Valley, CA (US)

(73) Assignee: Google LLC, Mountain View, CA (US)

( * ) Notice: Subject to any disclaimer, the term of this patent is extended or adjusted under 35 U.S.C. 154(b) by 183 days.

(21) Appl. No.: 14/754,554

(22) Filed: Jun. 29, 2015

Related U.S. Application Data

(60) Provisional application No. 62/018,499, filed on Jun. 27, 2014.

(51) Int. Cl.
*H04L 29/00* (2006.01)
*H04L 29/06* (2006.01)
*H04L 29/08* (2006.01)

(52) U.S. Cl.
CPC .......... *H04L 63/1433* (2013.01); *H04L 67/22* (2013.01)

(58) Field of Classification Search
CPC ............................ H04L 63/1433; H04L 67/22
USPC ............................................................ 726/25
See application file for complete search history.

(56) References Cited

U.S. PATENT DOCUMENTS 8,606,792 B1 * 12/2013 Jackson ............ G06F 17/30699
707/748
8,645,396 B2 * 2/2014 McNally .............. G06Q 10/063
705/14.2

\* cited by examiner

*Primary Examiner* — Anthony Brown
*Assistant Examiner* — Michael D Anderson
(74) *Attorney, Agent, or Firm* — McDermott Will & Emery LLP

(57) ABSTRACT

A non-transitory machine-readable media embodying instructions executable by one or more processors to perform a method is provided. In one aspect, the method includes receiving, from a first computing device associated with a first account, a request for interaction with a second computing device associated with a second account, wherein the first account is assigned a quota for interacting with one or more accounts. The method includes determining a cost associated with the interaction. The method includes, when the quota exceeds the cost, determining that the interaction is allowed and deducting the cost from the quota. Systems and methods are also provided.

20 Claims, 4 Drawing Sheets

ADAPTIVE RISK MITIGATION ENGINE TO FACILITATE SAFE INTERACTIONS BETWEEN ENTITIES

CROSS-REFERENCE TO RELATED APPLICATION

The present application claims the benefit of U.S. Provisional Patent Application Ser. No. 62/018,499, entitled "Adaptive Risk Mitigation Engine To Facilitate Safe Interactions Between Entities," filed on Jun. 27, 2014, the contents of which are hereby incorporated by reference in its entirety for all purposes.

BACKGROUND

Actions performed on online social environments may be monitored and regulated to limit undesirable interactions. Current methods of regulating user interactions may not sufficiently take into account different factors in making determinations. Because the current methods may only take limited factors into account in making determinations, they may be susceptible to abuse and work-arounds.

SUMMARY

The present disclosure generally relates to facilitating interactions between users, and more particularly to, for example, without limitation, an adaptive risk mitigation engine to facilitate safe interactions between users in an online social environment.

According to one or more implementations of the present disclosure, a computer-implemented method is provided. The method includes receiving, from a first computing device associated with a first account, a request for interaction with a second computing device associated with a second account, wherein the first account is assigned a quota for interacting with one or more accounts. The method includes determining a cost associated with the interaction. The method includes, when the quota exceeds the cost, determining that the interaction is allowed and deducting the cost from the quota.

According to one or more implementations of the present disclosure, a system is provided. The system includes one or more memories and one or more processors configured to execute executable instructions to receive, from a first computing device associated with a first account, a request for interaction with a second computing device associated with a second account, wherein the first account is assigned a quota for interacting with one or more accounts. The processor is further configured to determine a cost associated with the interaction. The processor is further configured to, when the quota exceeds the cost, determine that the interaction is allowed, deduct the cost from the quota, and determine whether to notify the second computing device.

According to one or more implementations of the present disclosure, a non-transitory machine-readable medium embodying instructions is provided. These instructions, when executed by a machine, allow the machine to perform a method. The method includes receiving, from a first computing device associated with a first account, a request for interaction with a second computing device associated with a second account, wherein the first account is assigned a quota for interacting with one or more accounts. The method includes determining a cost associated with the interaction. The method includes, when the quota exceeds the cost, initiating the interaction and deducting the cost from the quota.

These and other embodiments can include one or more of the following features. The determining the cost may comprise determining a reputation score for each of the first account and the second account, determining a difference between the reputation scores for the first account and the second account, and determining the cost based on the determined difference between the reputation scores. The determining the reputation score for each of the first account and the second account may comprise increasing the reputation score for the respective account based on other users providing positive feedback for the respective user account. The determining the reputation score for each of the first account and the second account may comprise decreasing the reputation score for the respective account based on other users flagging content shared by the respective account as at least one of offensive content, advertising content or phishing content. The determining the cost may comprise determining an interaction history score based on past interactions between the first account and the second account, and determining the cost based on the determined interaction history score. The determining the interaction history score may comprise determining a frequency of interaction between the first account and the second account, and determining the interaction history score based on the determined frequency of interaction. The determining the interaction history score may comprise determining a number of refusal requests for interaction between the first account and the second account, and determining the interaction history score based on the determined number of refusal requests for interaction. In response to determining that the interaction is allowed, interaction may be initiated between the first computing device and the second computing device. When the cost exceeds the quota, a determination may be made that the interaction is denied, and in response to determining that the interaction is denied, a notification may be sent to the first computing device associated with the first account without initiating interaction between the first computing device and the second computing device. When the quota exceeds the cost, a determination may be made whether to notify the second computing device, and when the second computing device is determined to be notified, a notification may be sent to the second computing device. Determining whether to notify the second computing device may be based on the cost. The second computing device may be notified when the cost is below a first predetermined threshold value. The second computing device may be notified with an urgency indicator when the cost is below a second predetermined threshold value, the second predetermined threshold value being less than the first predetermined threshold value. A request may be received, from the first computing device associated with the first account, for an interaction with a third computing device associated with a third account, wherein the first account is associated with an updated quota, wherein the updated quota comprises the cost deducted from the quota, a second cost associated with the interaction with the third computing device may be determined, and when the updated quota exceeds the second cost, a determination may be made that the interaction with the third computing device is allowed, and the second cost may be deducted from the updated quota. The determining the second cost may comprise determining a reputation score for each of the first account and the third account, determining a difference between the reputation scores for the first account and the third account, and determining the cost based on the determined difference between the reputation scores. The determining the second cost may comprise determining an interaction history score based on past interactions between the first account and the third account, and determining the cost based on the determined interaction history score.

The description in this summary section may provide some illustrative examples of the disclosure. This section is not intended to be a broad overview or to identify essential elements of the disclosure.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed implementations and together with the description serve to explain the principles of the disclosed implementations. In the drawings.

DETAILED DESCRIPTION

Figure 1:
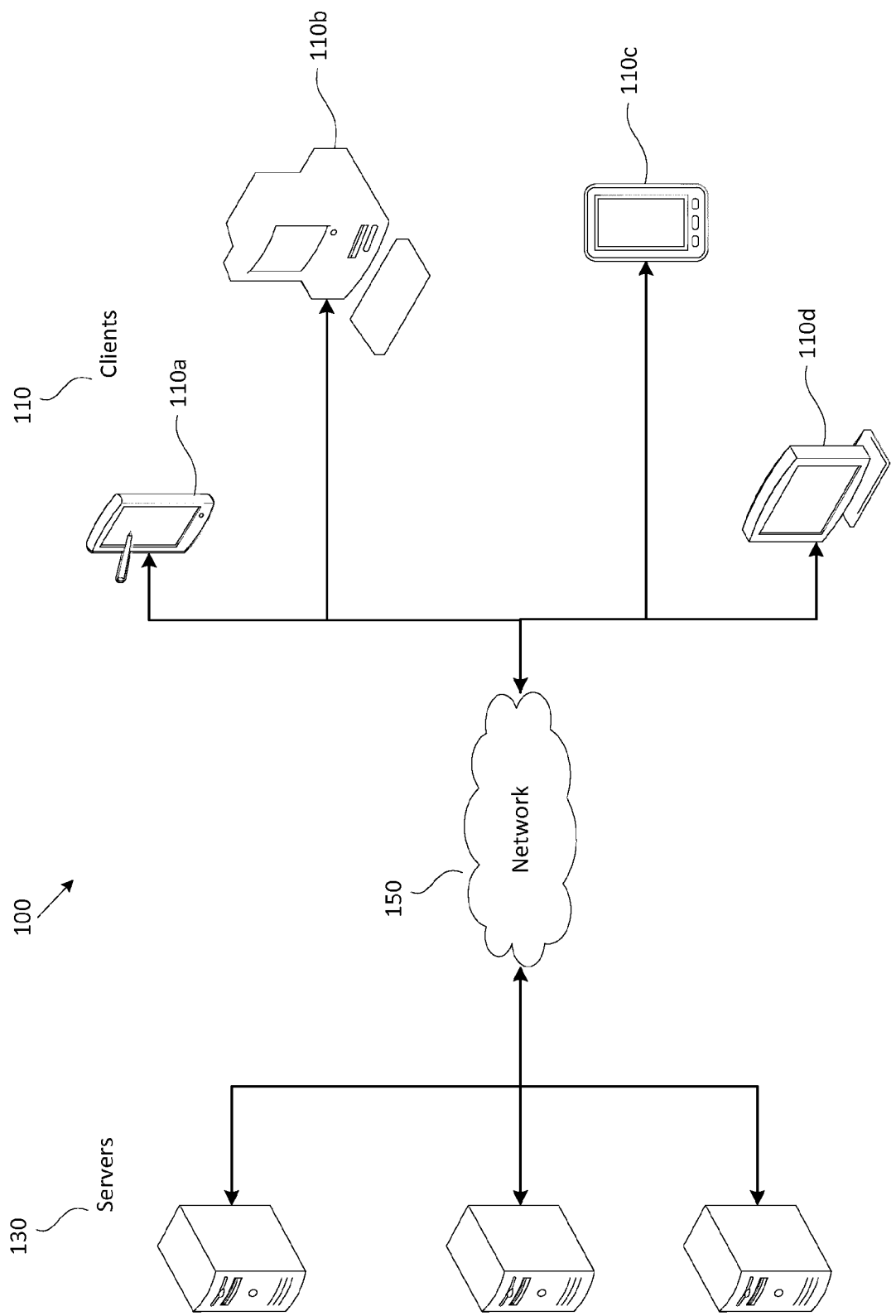
FIG. 1 illustrates an example network environment in which an adaptive risk mitigation engine may be implemented.

In the following detailed description, numerous specific details are set forth to provide a full understanding of the present disclosure. It will be apparent, however, to one ordinarily skilled in the art that implementations of the present disclosure may be practiced without some of these specific details. In other instances, well-known structures and techniques have not been shown in detail so as not to obscure the disclosure. While the disclosure may refer to a social environment for the interactions, one ordinarily skilled in the art will recognize that the disclosure may apply to non-social scenarios in which it is desirable to ensure that a community of users are not adversely affected by an abuser's actions. For example, the disclosure may apply to a shared resource, such as CPU resources on the cloud, in order to limit abuse.

In one or more implementations, actions may be accomplished among a plurality of computing devices. A computing device may be associated with an account. An account may be associated with a user, an operator, a group, an entity, a machine or other identifiable subject or body. A user account may be, for example, without limitation, an email account, a social media account, a phone number, an account associated with a messaging application, an account associated with a video chat application, a teleconferencing account, an electronic address, a messaging address, an IP address, a machine ID, or a camera ID, where IP refers to internet protocol and ID refers to identification. A user account may also be other types of accounts. For example, when a first user interacts with a second user, this may be accomplished by a first computing device associated with a first user account interacting with a second computing device associated with a second user account. In one aspect, a user may have an email account and a social media account, and the user may initiate interaction between the user's email account and the user's social media account. For example, a mobile device having the user's email account may initiate interaction with a desktop computer having the user's social media account and vice versa. In another aspect, a first computing device (e.g., a client device such as a laptop, a desktop computer, a mobile device, a wireless device) may interact with a second computing device (e.g., a server) and vice versa. The first computing device may be associated with a first account, and the second computing device may be associated with a second account. Interactions can be of a variety of types: user to user, user to user's content, user to system, user to user's proxy (e.g., such as a social networking page), or any other action initiated by the user. For example, User A commenting on User B's photo could be an interaction, as User B's photo is acting as a proxy for User B.

Actions performed on online social environments may be monitored and regulated to limit undesirable interactions. For example, a first user who does not wish to interact with a particular second user may "block" the second user or otherwise restrict the second user's ability to interact with the first user. The first user may report the second user to an administrator of the online social environment to restrict the second user's ability to interact with the first user. Users may be associated with reputation scores in order to determine the extent to which each user may initiate interaction with others.

However, in one or more aspects, the reputation of a user initiating interaction alone may not be sufficient to assess whether or not the interaction with another user should be allowed, or "safe." For example, while it may be desirable to limit the ability of a user with low reputation from interacting with users of higher reputation, the user of low reputation may still be allowed to interact with others of low reputation. In another example, a user who otherwise has a good reputation may still be limited in initiating interactions with another user of good reputation but receives a high volume of interaction requests, such as a celebrity. Similarly, users at risk of unwanted lascivious contact should be shielded from interactions with individuals who have a pattern of sharing or consuming salacious content. Current methods of regulating user interactions do not sufficiently take into account different factors in making determinations regarding limiting interactions. Because the current methods only take limited factors into account in making determinations, they are susceptible to abuse and work-arounds.

In order to form a more sophisticated determination regarding limiting interactions, the intended audience of an action may be considered. In addition, past interactions between users may be considered. In some aspects, past interactions that have occurred more recently may contribute more to the consideration than past interactions that have occurred further in the past. In taking these factors into consideration, any relationship to and from two users may be broken down on an action by action basis, and a dynamic ambiance for each user who receives an interaction may be allowed.

Each social interaction may be treated as a direct edge from the sender to the recipient of the interaction. The directed edge is then assigned a cost, as a prediction of risk of that action alone and any additional risk, given the comparison of the sender's reputation relative to the recipient's reputation and other known information, including previous interaction. As described above, an interaction may be of a variety of types, including, but not limited to: user to user, user to user's content, user to system, user to user's proxy, or any other action initiated by the user.

Once the cost is calculated for an interaction between the sender and the recipient, a more informed decision may be made whether to permit the interaction, as well as the visibility or exposure appropriate to generate for the interaction, on a case-by-case basis.

By taking these additional factors into account, good behavior can be encouraged by allowing those of higher reputation to perform more interactions. In addition, abuse of the system can be prevented by incorporating additional factors, making the system more difficult to work around. If the actions of abusive users are limited, the infrastructure of the online social environment may be protected and other users may not be overwhelmed by the actions of the abusive members.

FIG. 1 illustrates a network environment 100 in which the adaptive risk mitigation engine may be implemented. The environment 100 includes servers 130 and client devices (or computing devices) 110a-110d connected over a network 150. As an illustrative example, a first user associated with a first user account, using a client device 110a, may send a request for interaction with a second user associated with a second user account. The first client device 110a may send the request for interaction to a server 130. When the server 130 determines that the interaction is allowed, the server 130 determines whether a notification should be sent to the second device 110b. In one or more aspects, when the server 130 determines the interaction is denied, nothing is sent to the second client device 110b, but a notification indicating denial of the interaction may be sent to the first client device 110a.

The client devices 110 can be, for example, desktop computers, mobile computers, tablet computers, mobile devices (e.g., a smartphone or PDA), set top boxes (e.g., for a television), video game consoles, or any other devices having processor, memory, and communications capabilities. In some implementations, a client device 110 may be a proxy server or other intermediary that makes connections and fetches resources on behalf of some other client device.

The servers 130 can be any device having a processor, memory, and communications capability. Use of more than one server allows for load balancing between the servers. The servers 130 may include an authentication server to verify a user can use a particular user account for interacting with one or more users. Verification may include the user presenting account credentials associated with the user account. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
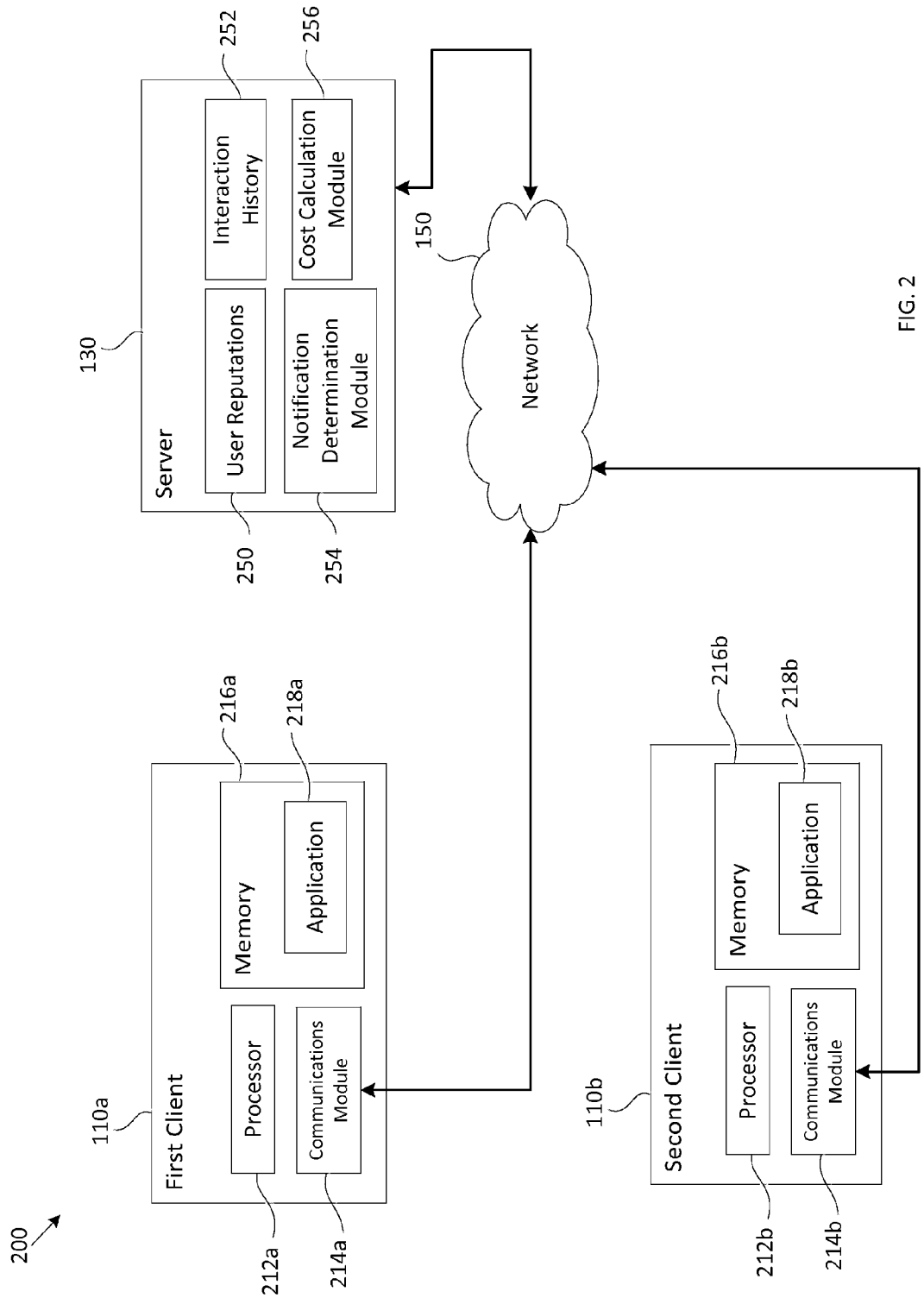
FIG. 2 is a block diagram illustrating example clients and server from the architecture of FIG. 1 according to certain aspects of the disclosure.

FIG. 2 is a block diagram 200 illustrating an example first client device 110a associated with a first user, an example second client device 110b associated with a second user, and server 130 in the architecture 100 of FIG. 1 according to certain aspects of the disclosure. The first client device 110a and the server 130 are connected over the network 150. The second client device 110b and the server 130 are connected over the network 150.

Both first client device 110a and second client device 110b include a processor 212a, 212b, a communications module 214a, 214b, and a memory 216a, 216b that stores an application 218a, 218b. The processor 212a, 212b of each of the first client device 110a and second client device 110b is configured to execute instructions stored in memory 216a, 216b.

The communications module 214 is configured to interface with the network 150 to send and receive information, such as data, requests, responses, and commands to other devices on the network. The communications module 214 can be, for example, a modem or an Ethernet card.

The application 218a, 218b may be an application configured to be executed on first client device 110a or second client device 110b. The application 218a, 218b may be an application facilitating an interaction between two users, such as a chat application, social networking application, or a video conferencing application. Alternatively, the application 218a, 218b may be a web browser accessing an application facilitating an interaction between two users, such as an online chat application, an online social networking application, or an online video conferencing application.

The server 130 is accessible over the network 150 and stores user reputations 250 and interaction history between users 252. Server 130 also contains a notification determination module 254 and a cost calculation module 256.

A user reputation is a representation of a particular user's standing in an online social community. The particular user's reputation may be based on, for example, feedback from other users, the user's behavior in the online social environment, or system-applied verdicts and flags. For example, User A may post or publish offensive text, pictures, or links to offensive text or pictures and other users may report the post as offensive. In turn, User A's reputation may decrease. In another example, User A may message multiple advertisements to User B. User B may report the messages as advertisements or spam, and User A's reputation may decrease. In another example, User A may message to User C multiple solicitations for personal information or scams aimed at obtaining personal information. User C may report the messages as phishing or scams, and User A's reputation may decrease.

Interaction history 252 between users may be a representation of previous interactions between any two users. For example, User A and User D may frequently interact with each other. Further, User A has not previously blocked User D and vice-versa. In addition, User A has not previously refused a request for interaction from User D. In this example, the interaction history between User A and User D may be very positive, as User A and User D frequently communicate, do not block each other, and do not refuse requests for interaction. In another example, User A and User E may have never interacted before. In this case, there is no interaction history, positive or negative. In another example, User A may occasionally request an interaction from User F. User A has not previously blocked User F and vice-versa. However, User F may sometimes refuse requests for interaction from User A. In this case, the interaction history between User A and User F may be average. In yet another example, User A may request interactions with User G frequently, but User G almost always refuses them. User A may have blocked User G for a brief period of time in the past. In this case, the interaction history between User A and User G may be very poor.

In some aspects, in the interaction history between two users, not all past history may be treated equally. For example, in some cases, interactions further in the past may have less weight in cost determination than more recent interactions.

In some aspects, the interaction history between two users may be different based on who has initiated the request for interaction. For example, User A may request interactions with User H much more frequently than User H requests interactions with User A. User A's requests may be occasionally refused by User H, but User H's requests are not refused by User A. In this example, the interaction history between User A and User H, when User A is initiating the request for interaction, may be average because User A and User H occasionally interact, but User H sometimes refuses User A's requests for interaction. However, the interaction history between User A and User H when User H is initiating the request for interaction may be positive because User A has not refused a request for interaction from User H.

Each user is associated with a set quota for interactions. If a requested interaction is allowed, the cost of the interaction is deducted from the quota, resulting in a revised quota value. If a subsequent requested interaction is allowed, the cost of the subsequent interaction is deducted from the revised quota value. For example, if User A's quota is 100 and a first requested allowed interaction has a cost of 30, then for a subsequent request for interaction, the cost of the subsequent request for interaction is compared with the revised quota value of 70. In some aspects, the quota is the same for all users. In other aspects, the quota may change, depending on the user. If the quota is not the same for all users, a user's quota may be dynamically changed based on the reputation of the user initiating interaction. A default quota may be determined for average users and adjusted to the reputation of the user initiating interaction. The quota may be higher for users of higher reputation and lower for users of lower reputation, as compared to an average user.

The quota may be refreshed periodically. In some aspects, the quota is refreshed on a daily basis, weekly basis, monthly basis, etc. When the cost of an interaction is greater than the requesting user's quota, the requesting user may receive a notification that the requesting user does not have sufficient quota to have the interaction. Once a user's quota has been exhausted, the user may not establish further interactions until quota has been refreshed. However, in one or more aspects, the user is not prevented from making further requests for interactions.

The cost calculation module 256 may determine, for any given request for interaction between two users, the cost associated with the request for interaction. If the user's quota is greater than or equal to the determined cost, the determined cost is deducted from the requesting user's quota. The cost may be based on at least one of: the requesting user's reputation, the reputation of the user to whom the request is directed, or the interaction history between the two users. The cost may also be based on quality actions. As an illustrative example, a quality action may be a frequency of performing an action, such as frequency of a user contacting at-risk users, that is much higher than a common frequency of contact for an average user. In this example, the user's ability to interact with at-risk users may be curtailed because the frequency of contact with at-risk users is suspect. Quality actions may be a component of a user's reputation.

As an illustrative example of cost calculation, User A may request an interaction with User I. User A may have a low reputation, User I may have an average reputation, and the interaction history between User A and User I, when User A initiates interaction, may be poor. For these reasons, User A's cost for interacting with User I may be high. In this way, User A may exhaust his/her quota quickly by interacting with User I. This limits the number of times User I receives interactions from User A, who User I may not wish to interact with frequently.

In another example, User A, having a low reputation, may request an interaction with User J, having a high reputation, and there is no interaction history between User A and User J. In this example, because of User J's high reputation compared to User A's low reputation, User A's cost for interacting with user J may be very high. In this example, User A may exhaust his/her quota quickly by interacting with User J. This limits the number of times User J receives interactions from User A, who user J may not wish to interact with frequently.

In another example, User A, having an average reputation, may request an interaction with User K, having a low reputation, and there are no negative previous interactions between User A and User K initiated by User A. In this example, the cost to A to interact with User K may be average, based on the lack of bad previous interactions with User K initiated by User A.

In another example, User A, having an average reputation, may request an interaction with User L, having a high reputation, and there are no previous interactions between User A and User L. In this case, due to User L's high reputation compared to User A's average reputation, the cost to A to interact with User L is very high.

In another example, User A, having a high reputation, may request an interaction with User M, having a low reputation, and there are no previous interactions between User A and User M. In this case, the cost to User A to interact with User M is low.

In yet another example, User A, having a high reputation, may request an interaction with User N, having an average reputation, and User A and User N have a positive history of interactions. In this case, the cost to User A to interact with User N is low.

In some aspects, after a cost has been determined and the cost is lower than or equal to the quota, the request for interaction is allowed and an invitation is generated. A further determination of manner of notification may be made by notification determination module 254 to determine the appropriate path by which the invitation should be delivered. If the cost is low (e.g., lower than a predefined threshold), the invitation may be sent and the recipient user client device will be notified of the invitation. The notification may be made via synchronous/push notification to a mobile device, synchronous/push notification to a computer display, and/or asynchronous notification via e-mail or some other non-real-time means. If the cost is not low (e.g., higher than a predefined threshold), an invitation may be sent, but a notification may not be sent. For example, invitations that do not trigger notifications may be visible to the user when the user accesses the client device or an application running on the client device, but may be visually separated on the client device or an application running on the client device from invitations that do trigger notifications. Invitations that do not trigger notifications may be stored in a separate "spam" or "low quality" folder, or visually separated by other means.

For example, User O may receive an invitation for request for interaction from User A, and the invitation may be an email sent to User O's email account. The invitation may be directly sent to a designated folder in User O's email account. User O may receive the invitation in his/her email and not receive an alert on his/her mobile device.

The determination of manner of notification may be based on the cost associated with the request for interaction. The determination of manner of notification may further be based on a threshold value for cost. For example, User A would like to interact with User P. In this example, interactions that have costs of more than 50 may trigger an invitation being sent, but not a notification being sent and interactions that have costs of 50 or less may trigger an invitation being sent and a notification being sent. If the cost to User A to interact with User P is 60 and User A has sufficient quota, then an invitation may be sent, but a notification may not be sent. Accordingly, if the cost to User A to interact with User P is 40 and User A has sufficient quota, then an invitation may be sent and a notification may also be sent. In this way, interactions with high costs may not be important to the recipient, so notifications may not be sent, but interactions with low costs may be important and welcome to the recipient, so notifications may be sent.

In addition, there may be multiple levels of notification priorities. For example, there may be a first threshold value where no notification is sent if the cost associated with the interaction is greater than the first threshold value. There may be a second threshold value where a notification with no urgency indication is sent if the cost associated with the interaction is less than or equal to the first threshold value, but greater than the second threshold value. A notification with an urgency indication may be sent if the cost associated with the interaction is less than the second threshold value. The urgency indication may be, for example, an indication indicating high priority, high urgency, or high importance relative to other notifications without the urgency indication. In addition, there may be a third threshold value lower than the first threshold value where no invitation is sent and the interaction is simply permitted.

Figure 3:
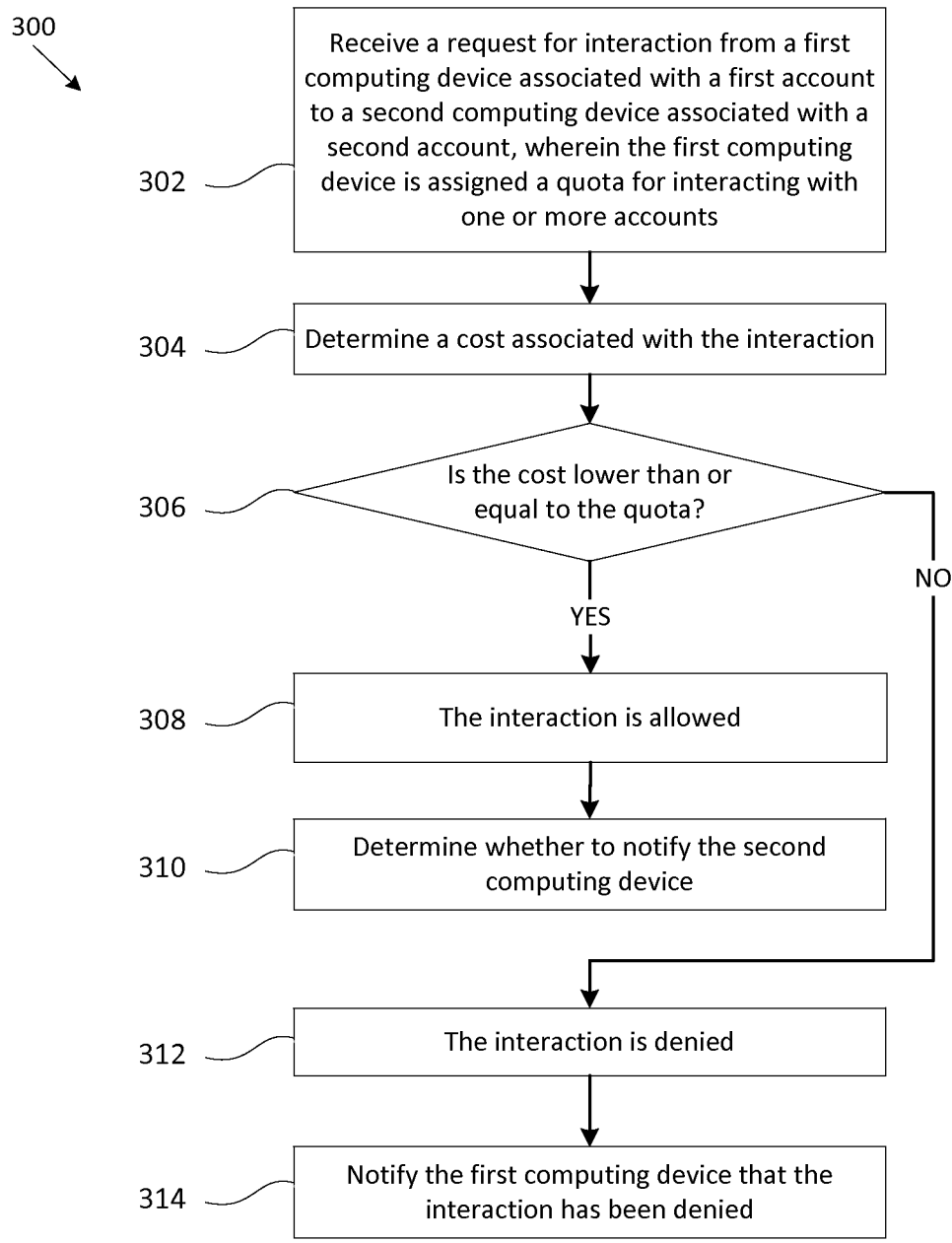
FIG. 3 illustrates an example process for an adaptive risk mitigation engine using one of the example clients of FIG. 2.

FIG. 3 illustrates an example process 300 for an adaptive risk mitigation engine using, for example, first client device 110a, second client device 110b, network 150, and server 130 of FIG. 2. While FIG. 3 is described with reference to FIG. 2, it should be noted that the process blocks of FIG. 3 may be performed by other systems.

A first user, using the first client device 110a, may wish to interact with a second user, using the second client device 110b. To this end, the first user, using the first client device 110a, may send a request to interact with the second user. The first user, like all users, is assigned a quota for interacting with others. The quota may refresh periodically (e.g., every hour, every day, every week, etc.). Alternatively, the quota may be set once and not refreshed. The server 130 receives the request for interaction from the first user to the second user (302).

The cost calculation module 256 determines a cost associated with the interaction (304). As described above, the cost associated with the interaction may be based on at least one of the first user's reputation or the second user's reputation. Alternatively, or in addition, the cost may be based on the interaction history between the first user and the second user.

The server 130 determines whether the cost associated with the interaction is lower than or equal to the quota (306). If the cost is lower than or equal to the quota, the interaction is allowed (308). The notification determination module 254 determines whether to notify the second computing device (310). As described above, if the cost is above a threshold value, the second user may be sent an invitation for interaction with the first user, but may not be sent a notification; if the cost is below a threshold value, the second user may be sent an invitation for interaction with the first user and may also be sent a notification. Invitations and notifications may be sent to the second user's device 110b over network 150.

If the cost is not lower than or equal to the quota, the interaction is denied (312). The first user's quota is unaffected. The first user is notified that the interaction has been denied (314). The first user, seeing the notification that the interaction has been denied, may be dissuaded from sending further requests for interaction until the quota associated with the first user is replenished.

As noted above, FIG. 3 sets forth an example process 300 for an adaptive risk mitigation engine using the example first client device 110a, second client device 110b, network 150, and server 130 of FIG. 2. An example will now be described using the example process 300 of FIG. 3, a first user named Arnold using a first client device 110a that is a laptop and a second user named Hugo using a second client device 110b that is a smartphone.

Arnold, wishing to interact with Hugo, sends a request from his laptop 110a to interact with Hugo. Arnold has a high reputation, and Hugo has an average reputation. Arnold and Hugo have a past interaction history that is positive, and Arnold has 78 of his daily quota of 100 remaining. The server 130 receives the request from Arnold's laptop 110a (302).

The cost calculation module 256 determines that the cost to Arnold of interacting with Hugo is 6—a low value (304). The cost of 6 is compared to Arnold's remaining quota of 78 (306). The cost is lower than or equal to the quota, so the interaction is allowed (308).

The notification determination module 254 determines whether to notify Hugo (310). In this example, if the cost associated with an interaction is less than or equal to 20, the user receiving the interaction is sent an invitation and notified. Since the cost associated with the interaction requested by Arnold to Hugo is 6, the server 130 will send an invitation and notification to Hugo's smartphone 110b.

Figure 4:
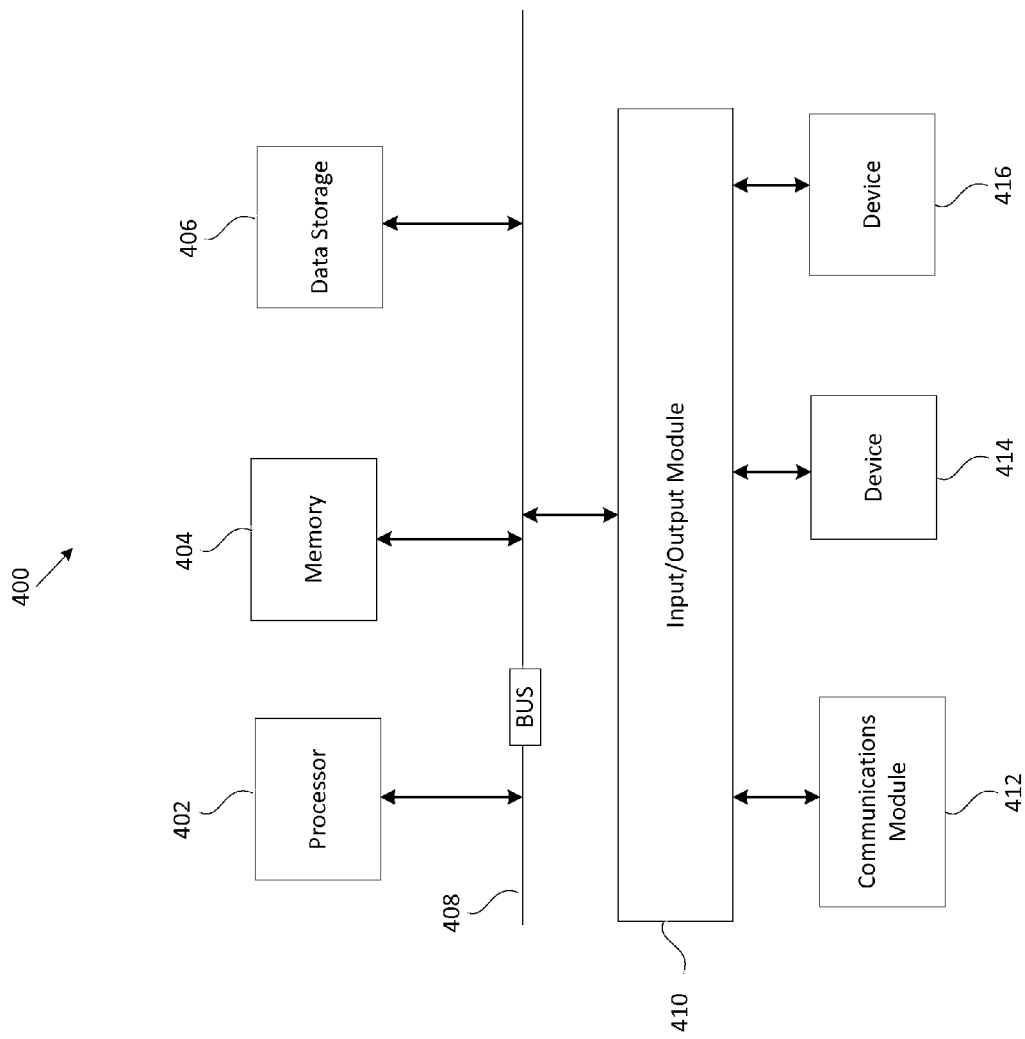
FIG. 4 is a block diagram illustrating an example computer system with which some implementations of the subject technology can be implemented.

FIG. 4 is a block diagram illustrating an example computer system 400 with which some implementations of the subject technology can be implemented. In certain aspects, the computer system 400 may be implemented using hardware or a combination of software and hardware, either in a dedicated server, or integrated into another entity, or distributed across multiple entities.

Computer system 400 (e.g., client devices 110 and servers 130) includes a bus 408 or other communication mechanism for communicating information, and a processor 402 (e.g., processor 212) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 (e.g., communications module 214) include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a LED (light emitting diode), CRT (cathode ray tube), or LCD (liquid crystal display) screen, for displaying information to the user.

According to one aspect of the present disclosure, the client device 110 and server 130 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

Computing system 400 can include client devices and servers. A client device and server are generally remote from each other and typically interact through a communication network. The relationship of client device and server arises by virtue of computer programs running on the respective computers and having a client-server relationship to each other.

The term "machine-readable storage medium" or "computer readable medium" as used herein refers to any medium or media that participates in providing instructions or data to processor 402 for execution. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

The following claims are hereby incorporated into the Detailed Description, with each claim standing on its own as a separately claimed subject matter. In one aspect, any of the claims herein may be revised to depend from any one of the independent claims or any one of the dependent claims. In one aspect, any of the claims (e.g., dependent or independent claims) may be revised to be combined with any other one or more claims (e.g., dependent or independent claims). In one aspect, a claim may be revised to include some or all of the words (e.g., steps, operations, means or components) recited in a claim, a sentence, a phrase or a paragraph. In one aspect, a claim may be revised to include some or all of the words recited in one or more claims, sentences, phrases or paragraphs. In one aspect, some of the words in each of the claims, sentences, phrases or paragraphs may be removed. In one aspect, additional words or elements may be added to a claim, a sentence, a phrase or a paragraph. In one aspect, the subject technology may be implemented without utilizing some of the components, elements, functions or operations described herein. In one aspect, the subject technology may be implemented utilizing additional components, elements, functions or operations.

Methods and operations described in the specification or the claims can be implemented, for example, using a non-transitory machine-readable medium, a system or a computer-implemented method. A non-transitory machine-readable medium may embody instructions, where the instructions are executable by one or more processors to perform the method(s) or operation(s). A system may comprise one or more memories and one or more processors configured to execute executable instructions to perform the method(s) or operation(s). A machine-implemented method may comprise the method(s) or operation(s).

What is claimed is:

1. A non-transitory machine-readable medium embodying instructions, the instructions executable by one or more processors to perform a method, the method comprising:

receiving, by a server from a first computing device associated with a first account, a request for interaction with a second computing device associated with a second account, wherein the first account is assigned a quota for interacting with one or more accounts;

determining, by the server, a cost associated with the interaction; and when the quota exceeds the cost:
determining, by the server, that the interaction is allowed; and
deducting the cost from the quota;

determining, by the server based on the cost, an online path of delivery for delivering an indication of the interaction to the second computing device; and providing the indication of the interaction to the second computing device using the determined online path of delivery.

2. The non-transitory machine-readable medium of claim 1, wherein the determining the cost comprises:
determining a reputation score for each of the first account and the second account;
determining a difference between the reputation scores for the first account and the second account; and
determining the cost based on the determined difference between the reputation scores.

3. The non-transitory machine-readable medium of claim 2, wherein the determining the reputation score for each of the first account and the second account comprises:
increasing the reputation score for the respective account based on other users providing positive feedback for the respective user account.

4. The non-transitory machine-readable medium of claim 2, wherein the determining the reputation score for each of the first account and the second account comprises:
decreasing the reputation score for the respective account based on other users flagging content shared by the respective account as at least one of offensive content, advertising content or phishing content.

5. The non-transitory machine-readable medium of claim 1, wherein the determining the cost comprises:
determining an interaction history score based on past interactions between the first account and the second account; and
determining the cost based on the determined interaction history score.

6. The non-transitory machine-readable medium of claim 5, wherein the determining the interaction history score comprises:
determining a frequency of interaction between the first account and the second account; and
determining the interaction history score based on the determined frequency of interaction.

7. The non-transitory machine-readable medium of claim 5, wherein the determining the interaction history score comprises:
determining a number of refusal requests for interaction between the first account and the second account; and
determining the interaction history score based on the determined number of refusal requests for interaction.

8. The non-transitory machine-readable medium of claim 1, wherein the method comprises, in response to determining that the interaction is allowed, initiating interaction between the first computing device and the second computing device.

9. The non-transitory machine-readable medium of claim 1, wherein the method comprises:
when the cost exceeds the quota, determining that the interaction is denied; and in response to determining that the interaction is denied, sending a notification to the first computing device associated with the first account without initiating interaction between the first computing device and the second computing device.

10. The non-transitory machine-readable medium of claim 1, wherein the online path of delivery is determined and the indication of the interaction is provided to the second computing device when the quota exceeds the cost.

11. The non-transitory machine-readable medium of claim 1, wherein providing the indication of the interaction comprises providing a notification to the second computing device of the interaction when the cost is below a first predetermined threshold value.

12. The non-transitory machine-readable medium of claim 11, wherein the second computing device is notified with an urgency indicator when the cost is below a second predetermined threshold value, the second predetermined threshold value being less than the first predetermined threshold value.

13. The non-transitory machine-readable medium of claim 1, wherein the method comprises:
receiving, from the first computing device associated with the first account, a request for an interaction with a third computing device associated with a third account, wherein the first account is associated with an updated quota, wherein the updated quota comprises the cost deducted from the quota;
determining a second cost associated with the interaction with the third computing device; and
when the updated quota exceeds the second cost:
determining that the interaction with the third computing device is allowed; and
deducting the second cost from the updated quota.

14. The non-transitory machine-readable medium of claim 13, wherein the determining the second cost comprises:
determining a reputation score for each of the first account and the third account;
determining a difference between the reputation scores for the first account and the third account; and
determining the cost based on the determined difference between the reputation scores.

15. The non-transitory machine-readable medium of claim 13, wherein the determining the second cost comprises:
determining an interaction history score based on past interactions between the first account and the third account; and
determining the cost based on the determined interaction history score.

16. A system comprising:
one or more memories; and
a server comprising one or more processors configured to execute executable instructions to perform operations to:
receive a request, from a first computing device associated with a first account, for interaction with a second computing device associated with a second account, wherein the first account is assigned a quota for interacting with one or more accounts;
determine a cost associated with the interaction; and
when the quota exceeds the cost:
determine that the interaction is allowed; and
deduct the cost from the quota;

determine, based on the cost, an online path of delivery for delivering an indication of the interaction to the second computing device; and provide the indication of the interaction to the second computing device using the determined online path of delivery.

17. The system of claim 16, wherein the one or more processors are configured to execute executable instructions to perform operations to, in response to determining that the interaction is allowed, initiate interaction between the first computing device and the second computing device.

18. The system of claim 16, wherein the one or more processors are configured to execute executable instructions to perform operations to:

when the cost exceeds the quota, determine that the interaction is denied; and in response to determining that the interaction is denied, sending a notification to the first computing device associated with the first account without initiating interaction between the first computing device and the second computing device.

19. A machine-implemented method, comprising:

receiving, by a server from a first computing device associated with a first account, a request for interaction with a second computing device associated with a second account, wherein the first account is assigned a quota for interacting with one or more accounts;

determining, by the server, a cost associated with the interaction; and when the quota exceeds the cost:
  initiating the interaction; and
  deducting the cost from the quota;

determining, by the server based on the cost, an online path of delivery for delivering an indication of the interaction to the second computing device; and providing the indication of the interaction to the second computing device using the determined online path of delivery.

20. The non-transitory machine-readable medium of claim 1, wherein the method further comprises:

determining that the cost exceeds a predetermined threshold; and providing, in response to the cost exceeding the predetermined threshold, the indication of the interaction for display in a user interface separated from notifications provided to the second computing device for interactions in which the quota exceeds the cost.

* * * * *